United States Patent [19]

Huggins

[11] Patent Number: 4,930,117
[45] Date of Patent: May 29, 1990

[54] WAVELENGTH DIVISION MULTIPLEXING SYSTEM USING OPTICAL SWITCH

[75] Inventor: Raymond W. Huggins, Mercer Island, Wash.

[73] Assignee: The Boeing Company, Seattle, Wash.

[21] Appl. No.: 211,382

[22] Filed: Jun. 24, 1988

[51] Int. Cl.⁵ .............................................. H04B 9/00
[52] U.S. Cl. ......................................... 370/3; 455/600
[58] Field of Search .............. 455/603, 605, 612, 613, 455/600; 370/1, 3; 350/96.13, 96.14, 96.18

[56] References Cited

U.S. PATENT DOCUMENTS

| | | | |
|---|---|---|---|
| 2,153,709 | 4/1939 | Bournisien | 455/606 |
| 3,166,672 | 1/1965 | Gardner | 455/600 |
| 3,536,402 | 10/1970 | Aston | 350/315 |
| 3,566,128 | 2/1971 | Arnuad | 455/601 |
| 3,679,290 | 7/1972 | Adams et al. | 350/316 |
| 4,050,807 | 9/1977 | Barbieri | 350/315 |
| 4,560,252 | 12/1985 | Mori | 350/315 |
| 4,669,811 | 6/1987 | McQuoid | 350/3.7 |

FOREIGN PATENT DOCUMENTS 0054363 6/1982 European Pat. Off. ............ 455/605

OTHER PUBLICATIONS

Tanaka, Serizawa & Tsujimoto, "Simple Structure High Isolation Multi/Demultiplexer", *Electronics Letters*, vol. 16, No. 23 (Nov. 1980), pp. 869–870.

*Primary Examiner*—Douglas W. Olms
*Assistant Examiner*—Alpus H. Hsu
*Attorney, Agent, or Firm*—Christensen, O'Connor, Johnson & Kindness

[57] ABSTRACT

An optical switch and a wavelength division multiplexing system utilizing the switch. The multiplexing system comprises an optical bus, an optical source, and a plurality of optical switches. The source provides light on the bus having a plurality of wavelength bands, and the switches are serially connected along the bus. Each switch includes means for reacting to an external stimulus by assuming one of at least two states. In a first state, light in all wavelength bands is transmitted through the switch. In a second state, light in a modulation wavelength band is attenuated, and light in the remaining bands is transmitted, the modulation band being different for each switch. The switch may comprise an optical bandpass filter onto which light from the bus is directed, such that light within the passband is transmitted, and light outside the passband is reflected. The transmitted beam is selectively attenuated in accordance with the external stimulus.

9 Claims, 3 Drawing Sheets

WAVELENGTH DIVISION MULTIPLEXING SYSTEM USING OPTICAL SWITCH

FIELD OF THE INVENTION

The present invention relates to optical data transmission systems and, in particular, to an optical wavelength division multiplexing system.

BACKGROUND OF THE INVENTION

Fiber-optic buses designed specifically for sensors have not yet progressed to the point of commercial development. Buses based upon optical time-domain reflectometers and on coherence multiplexing have been demonstrated, and buses based on wavelength division multiplexing have been proposed. The time domain reflectometer approach requires high-speed pulse techniques for successful operation, and coherence multiplexing is a relatively new concept that has not yet been developed to the level of commercial utilization. Wavelength division multiplexing, while reasonably straightforward, suffers from the lack of designs for sensors that are suitable for operation on such a bus.

SUMMARY OF THE INVENTION

The present invention provides an optical switch and a wavelength division multiplexing system utilizing the switch. The system provides a number of distinct advantages with respect to prior art optical multiplexing techniques.

In one aspect, the present invention provides an optical wavelength division multiplexing system comprising an optical bus, an optical source, and a plurality of optical switches. The optical source provides light having a plurality of wavelength bands, and couples such light onto the bus. The optical switches are serially coupled along the bus, and each switch includes means for reacting to an external stimulus by assuming one of at least two states. A first state is one in which light in all of the wavelength bands is substantially transmitted through the switch. A second state is one in which light in a modulation wavelength band is attenuated, and light in the remaining wavelength bands is substantially transmitted through the switch. The modulation band is different for each switch. Therefore by demultiplexing the composite optical signal on the bus, the state of the switch and the state of corresponding external stimulus may be determined.

In a second aspect, the present invention provides a switch for use in a multiplexing system of the type described above. In one embodiment, the switch comprises an optical bandpass filter having a predetermined passband. Light from the optical bus is directed onto the bandpass filter, such that light within the passband is substantially transmitted through the bandpass filter to produce a transmitted beam, and light outside the passband is substantially reflected to produce a reflected beam. The reflected beam is coupled from the bandpass filter back onto the bus. Means are provided for causing the transmitted beam to follow an optical path, and for coupling light from the optical path back onto the bus. Finally, means are provided for selectively attenuating light traveling along the optical path in accordance with an external stimulus, to thereby selectively pass or attenuate electromagnetic radiation in the passband. An embodiment utilizing a stopband filter rather than a passband filter is also described.

DETAILED DESCRIPTION OF THE INVENTION

Figure 1:
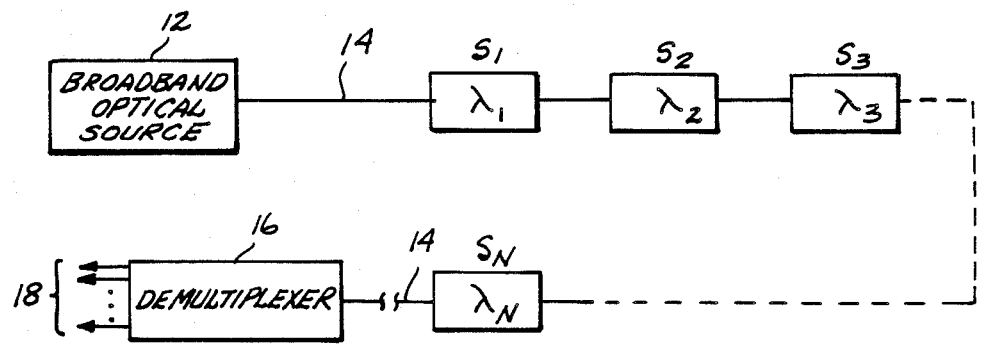
FIG. 1 is a block diagram of a wavelength division multiplexing system in accordance with the present invention.

FIG. 1 illustrates the overall architecture of a preferred embodiment of the wavelength division multiplexing system of the invention. The multiplexing system includes a broadband optical source 12, an optical bus 14, and a plurality of switches $S_1$–$S_N$ serially connected along bus 14. FIG. 1 also illustrates demultiplexer 16 coupled to bus 14, for demultiplexing the information multiplexed onto the bus by switches $S_1$–$S_N$.

Source 12 produces light, either from a broadband source or from a number of discrete sources having different wavelength emission bands, and launches such light onto bus 14. The term "light" should be understood to include all electromagnetic radiation capable of being transmitted by fiber-optic cables. Each switch S is "tuned" to a specific and unique modulation band, and selectively attenuates light having a wavelength within its modulation band in an on/off fashion, in response to an external stimulus. Light at wavelengths outside the modulation band is unmodulated, and is transmitted with a uniform attenuation which is small compared to the attenuation in the modulation band. At the end of bus 14, the emerging light is demultiplexed by demultiplexer 16, for example, by using a series of detectors, each of which is tuned to respond to wavelengths within the modulation band of one of the switches. An example of such a demultiplexer is a monochromator with a detector array in its image plane. Demultiplexer 16 produces N output signals, collectively identified by reference numeral 18, each output signal corresponding to a respective one of switches $S_1$–$S_N$.

Figure 2:
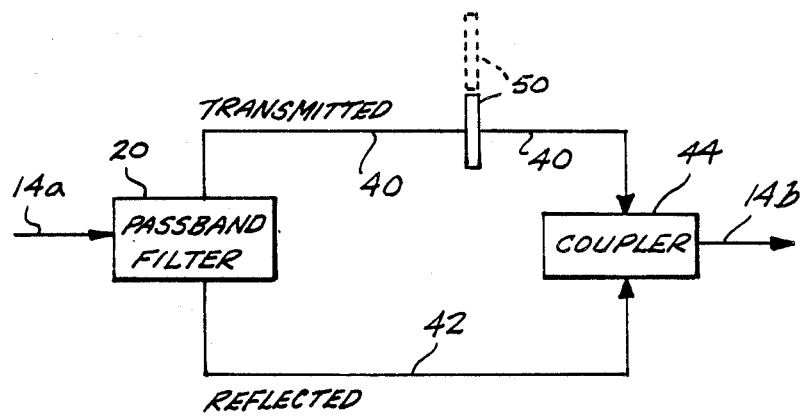
FIG. 2 is a schematic diagram of a preferred embodiment for one of the switches sown in FIG. 1.
Figure 3:
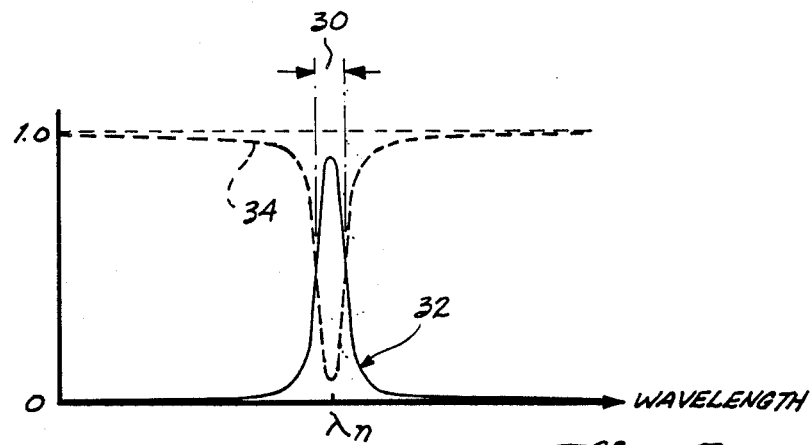
FIG. 3 is a graph showing the transmittance and reflectance curves for the switch of FIG. 2.

In a preferred embodiment, each switch S has the general arrangement shown in FIG. 2. The portion of bus 14 through which light enters the switch is designated 14a, and the portion of the bus through which light leaves the switch is designated 14b. The optical input signal on fiber optic cable 14a is directed onto optical passband filter 20 that preferably comprises an optical interference filter. The reflection/transmission characteristics of such a filter are shown in FIG. 3. Within a comparatively narrow passband 30 centered at a wavelength $\lambda_n$, the filter transmits most of the input signal, as indicated by transmission curve 32, while outside of passband 30, most of the input signal is reflected, as indicated by reflectivity curve 34. Such a filter has low loss, and the sum of reflection and transmission is essentially equal to unity at all pertinent wavelengths.

Referring again to FIG. 2, the light transmitted by passband filter 20 follows path 40, while the light reflected by passband filter 20 follows path 42. The light traveling along paths 40 and 42 is recombined at coupler 44, and the combined light exits the switch on fiber-optic cable 14b. Inserted in path 40 is a modulation element 50 that can be moved into and out of the path. When the modulation element is in path 40, as shown by solid lines in FIG. 2, the modulation element blocks and/or substantially attenuates the light traveling along path 40. When the modulation element is moved out of path 40, as indicated by phantom lines in FIG. 2, the light on path 40 is allowed to pass to coupler 44. Thus the switch diagrammed in FIG. 2 passes all light outside passband 30, and modulates the light within passband 30, in an on/off fashion, by means of movement of the modulation element. Modulation element 50 may be replaced by other types of modulation arrangements, as further described below.

Figure 4:
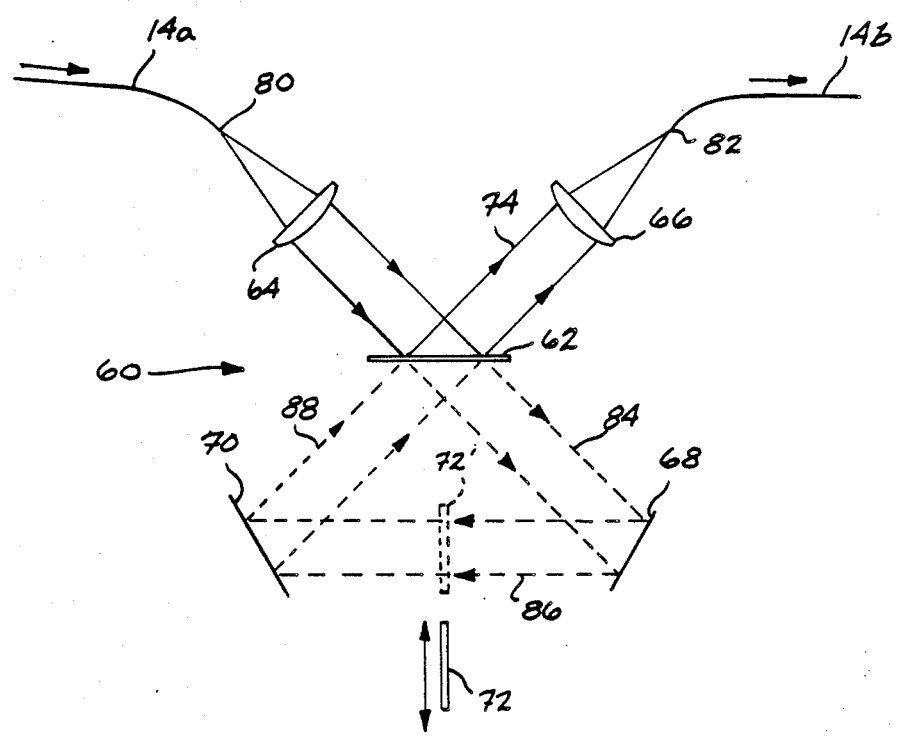
FIG. 4 is an optical diagram of a preferred embodiment of one of the switches.

FIG. 4 shows a preferred configuration for a switch of the type shown in FIG. 2. The switch 60 comprises interference (passband) filter 62, lenses 64 and 66, mirrors 68 and 70, and modulation element 72. The switch 60 receives light from the optical source or from the prior switch via fiber-optic cable 14a, and transmits particular components of such light, via fiber-optic cable 14b, to the next switch on the bus, or to demultiplexer 16. Fiber-optic cable 14a terminates within switch 60 at termination 80, and light exiting from termination 80 is collimated by lens 64 and directed onto interference filter 62. For light having a wavelength outside the passband of the interference filter, filter 62 simply reflects such light toward lens 66 along path 74. Lens 66 focuses the light traveling along path 74 into termination 82 of fiber-optic cable 14b.

For light within the passband of interference filter 62, the filter transmits such light through the filter along path 84. This transmitted light is reflected by mirrors 68 and 70 via paths 86 and 88 back onto filter 62. Path 88 is parallel to and coaxial with path 74, neglecting the small lateral displacement that occurs when the light passes through the filter. Light traveling along path 88 is therefore transmitted by filter 62 through the filter onto path 74, where it is combined with light reflected by the filter. With modulation element 72 in the position indicated by solid lines in FIG. 4, the modulation element does not interfere with light traveling along path 86. Light transmitted by filter 62 is thereby combined with light reflected by filter 62, and the switch passes all wavelength bands. However when modulation element 72 is moved upward to position 72' indicated by phantom lines, the modulation element blocks light traveling along path 86, with the result that light in the wavelength band transmitted by filter 62 is removed from the bus. Absence of light in the this wavelength band is indicated in the corresponding output 18 of demultiplexer 16.

Modulation element 72 may be any opaque element that may be attached to external means such as a door, a hand-actuated toggle, etc. When the modulation element is placed in the beam, light in the wavelength band within the passband of the filter is effectively removed from the broadband light propagating along the optical bus, while light outside the passband of the filter will not be affected by the position of the modulation element. The modulation element may be insertable at any point along paths 84, 86 or 88. Modulation element 72 may also comprise non-mechanical means, such as an electro-optic or magneto-optic device. For example, the modulation element could comprise an LCD screen positioned in one of the light paths, the LCD screen being either opaque or transmissive in response to an externally supplied electrical signal. The means for modulating the light could also comprise means for rotating or moving one of mirrors 68 and 70, such that beam 88 is either not formed, or does not reach lens 66.

The switch described above is optically simple, and the cost of production is therefore low. All switches on the bus may be mechanically identical, with the only difference being in the wavelength ranges of the modulation bands. This means that one basic mechanical design is required, and the appropriate interference filter may be fitted in the field if necessary. The number of switches that can be multiplexed on the bus is determined by two factors: (1) the passbands of the filters that are available; and (2) the insertion loss of each switch for light outside that switch's modulation band. With regard to the first factor, the modulation band of each switch must be sufficiently different from the modulation bands of other switches so that demultiplexer 16 can reliably detect whether that switch is in a blocking or nonblocking configuration. Narrow band interference filters are available with bandwidths of 1-20 nm. For sufficiently narrow filters, for example filters with an FWHM of 4 nm, the reflection coefficient only 10 nm removed from the peak wavelength may be as high as 99.9%. Thus in principle, several hundred switches could be multiplexed on a bus powered by a broadband source having a wavelength range of 600-1,000 nm. However the out-of-band insertion loss, including connectors, of each switch will typically be 2-3 dB, so that a realistic upper limit will be 10-20 switches. This assumes that the power in the modulation band of each switch is 5 uW, that each detector has a sensitivity of 500 pW, and that the allowed margin is 10 dB.

The multiplexing system shown in FIG. 1 possesses a number of distinct advantages as compared to prior wavelength division multiplexing systems. These advantages include the fact that the serial position of each switch on the bus is unimportant, and the fact that light in each wavelength band is attenuated by the same amount. Furthermore, analog and digital switches can be mixed on the same bus. Single-wavelength channels that do not have switches associated with them may be used as guard bands to avoid crosstalk, or for AGC purposes to compensate for unknown fiber or loop losses.

Figure 5:
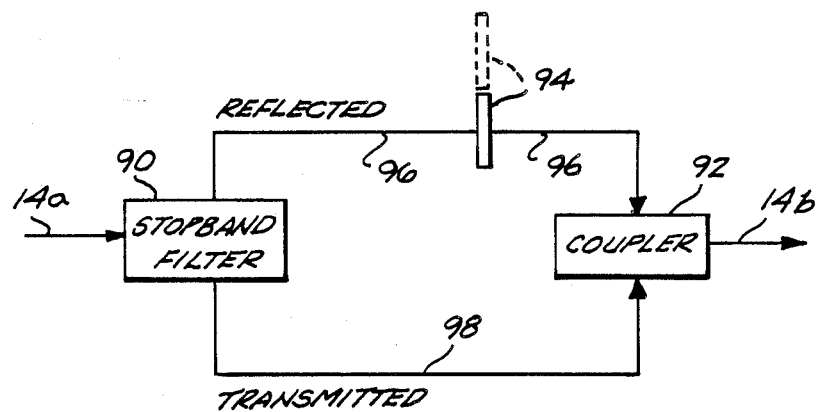
FIG. 5 is a schematic diagram of a second preferred embodiment for one of the switches.

In a second preferred embodiment, each switch S of FIG. 1 has the general arrangement shown in FIG. 5. The switch comprises stopband filter 90, coupler 92 and modulation element 94. Light enters the switch via bus 14a and leaves the switch via bus 14b. Stopband filter 90 reflects light within a predetermined stopband along path 96, and transmits light outside the stop band along path 98. The light traveling along path 96 is modulated by modulation element 94, and light from paths 96 and 98 is combined by coupler 92 onto output bus 14b. The reflection/transmission characteristics of the stopband filter are essentially identical to those shown in FIG. 3, except that curve 32 now represents the reflected light and curve 34 now represents the transmitted light.

Figure 6A:
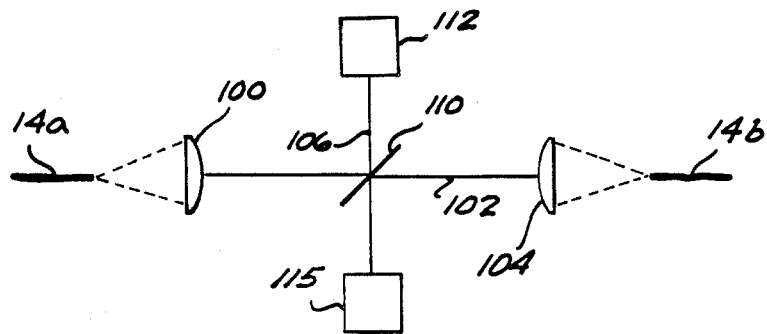
FIGS. 6A and 6B are optical diagrams of a second preferred embodiment of one of the switches.
Figure 6B:
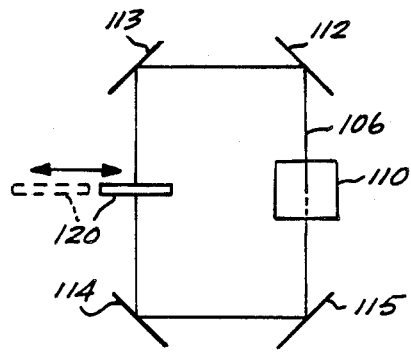

An implementation of the system shown in FIG. 5 is set forth in FIGS. 6A and 6B. Referring first to FIG. 6A, light from fiber-optic cable 14a is collimated by lens 100 and directed onto stopband filter 110. Light transmitted by the stopband filter follows path 102 to lens 104, and is focused by lens 104 into fiber-optic cable 14b. Light reflected by stopband filter 110 follows path 106 as shown in FIG. 6B. Path 106 is folded by four mirrors 112-115, and directed onto the opposite side of stopband filter 110, as shown in FIG. 6A. The stopband filter then reflects this light a second time, into fiber-optic cable 14*b* via lens 104. Modulation element 120 is insertable at any point along path 106. Alternatively, the modulation element could comprise means for rotating any one of mirrors 112-115.

While the preferred embodiments of the invention have been illustrated and described, variations will be apparent to those skilled in the art. Accordingly, the scope of the invention is to be determined by reference to the following claims.

The embodiments of the invention in which an exclusive property or privilege is claimed are defined as follows:

1. An optical wavelength division multiplexing system, comprising:
    an optical bus;
    an optical source for providing light having a plurality of wavelength bands and for coupling said light into the bus; and,
    a plurality of optical switches serially coupled along the bus, each switch including means for reacting to an external stimulus by assuming one of at least two states, a first state being one in which light in all of said wavelength bands is substantially transmitted through the switch, a second state being one in which light in a modulation wavelength band is attenuated and light in the remaining wavelength bands is substantially transmitted through the switch, the modulation wavelength band being different for each switch, each switch comprising an optical stopband filter having a predetermined stopband and opposed first and second surfaces, means for coupling light from the optical bus onto the first surface of the stopband filter such that light within the stopband is substantially reflected by the stopband filter to produce a reflected beam, and light outside the stopband is substantially transmitted through the stopband filter to produce a transmitted beam, optical path means for causing the reflected beam to follow an optical path and to then strike the second surface of the stopband filter such that the reflected beam is rereflected by the stopband filter and combined with the transmitted beam to produce a recombined beam, the optical path means comprising first and second mirrors, and modulation means for selectively attenuating light traveling along said optical path in accordance with the external stimulus, to thereby selectively pass or attenuate light in said stopband.

2. The multiplexing system of claim 1, wherein for each switch, the modulation means comprises a modulation element that can be moved into an out of a portion of the optical path between the mirrors, to thereby selectively block or transmit light traveling along the optical path.

3. The multiplexing system of claim 1, wherein for each switch, the modulation means comprises a modulation element positioned in the optical path between the mirrors, the modulation element being responsive to an external non-mechanical stimulus to either block or transmit light traveling along the optical path.

4. The multiplexing system of claim 1, wherein for each switch, the modulation means comprises means for diverting light traveling along said optical path between the mirrors such that it is not coupled back onto the bus.

5. A switch for use on an optical bus in an optical wavelength division multiplexing system, the switch comprising:
    an optical stopband filter having a predetermined stopband and opposed first and second surfaces;
    means for coupling light from the optical bus onto the first surface of the stopband filter such that light within the stopband is substantially reflected by the stopband filter to produce a reflected beam, and light outside the stopband is substantially transmitted by the stopband filter to produce a transmitted beam;
    optical path means for causing the reflected beam to follow an optical path and to then strike the second surface of the stopband filter such that the reflected beam is rereflected by the stopband filter and combined with the transmitted beam to produce a recombined beam;
    means for coupling the recombined beam back onto the bus; and
    the optical path means comprising first and second mirrors, and modulation means for selectively attenuating light traveling along said optical path in accordance with an external stimulus, to thereby selectively pass or attenuate electromagnetic radiation is said stopband.

6. The switch of claim 5, wherein the means for selectively attenuating light traveling along said optical path comprises a modulation element that can be moved into and out of a portion of the optical path between the mirrors, to thereby selectively block or transmit light traveling along the optical path.

7. The switch of claim 5, wherein for each switch, the means for selectively attenuating light traveling along said optical path comprises a modulation element positioned in the optical path between the mirrors, the modulation element being responsive to an external non-mechanical stimulus to either block or transmit light traveling along the optical path.

8. The switch of claim 5, wherein for each switch, means for selectively attenuating light traveling said optical path comprises means for diverting light traveling along said optical path between the mirrors such that it is not coupled back onto the bus.

9. The invention of claim 1 or 5, wherein the optical path followed by the reflected beam lies in a plain perpendicular to a direction of travel of the light coupled onto the first surface of the stopband filter, and wherein the optical path means comprises four mirrors.

* * * * *